US009648372B2

(12) United States Patent
McDonough et al.

(10) Patent No.: US 9,648,372 B2
(45) Date of Patent: *May 9, 2017

(54) INSERTING PERSONALIZED INFORMATION INTO DIGITAL CONTENT

(71) Applicant: FMR LLC, Boston, MA (US)

(72) Inventors: John C. McDonough, Nahant, MA (US); Hadley Rupert Stern, West Newton, MA (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,018

(22) Filed: Mar. 18, 2016

(65) Prior Publication Data

US 2016/0205428 A1 Jul. 14, 2016

Related U.S. Application Data

(60) Continuation-in-part of application No. 14/815,417, filed on Jul. 31, 2015, now Pat. No. 9,294,796, which
(Continued)

(51) Int. Cl.
*H04N 7/167* (2011.01)
*G06F 3/00* (2006.01)
(Continued)

(52) U.S. Cl.
CPC ....... *H04N 21/2668* (2013.01); *H04N 21/235* (2013.01); *H04N 21/2347* (2013.01);
(Continued)

(58) Field of Classification Search
None
See application file for complete search history.

(56) References Cited

U.S. PATENT DOCUMENTS 5,673,402 A 9/1997 Ryan et al.
5,715,018 A 2/1998 Fasciano et al.
(Continued)

FOREIGN PATENT DOCUMENTS

EP 2026569 A1 2/2009
JP 2001357300 A 12/2001
(Continued)

OTHER PUBLICATIONS

International Search Report and Written Opinion from PCT/US2010/042922, dated Sep. 13, 2010, 11 pages.
(Continued)

*Primary Examiner* — Jonathan V Lewis
(74) *Attorney, Agent, or Firm* — Proskauer Rose LLP

(57) ABSTRACT

Described are methods and apparatuses, including computer program products, for personalizing media content. A server determines content data likely to be requested by users, and generates common sets of information using the content data. The server receives a request for a digital media stream from a client device, and generates a first set of frames which include content data specific to the user and keys corresponding to a selected common set of information. The server combines the first set of frames and the requested stream to generate a personalized stream. The server transmits the personalized stream to a downstream device, which generates a second set of frames using content data corresponding to the one or more keys. The downstream device combines the second set of frames and the personalized stream to generate an updated stream, and transmits the updated stream to the client device.

21 Claims, 9 Drawing Sheets

Related U.S. Application Data is a continuation-in-part of application No. 14/749,204, filed on Jun. 24, 2015, now Pat. No. 9,294,795, which is a continuation of application No. 13/412,489, filed on Mar. 5, 2012, now Pat. No. 9,094,695, which is a division of application No. 12/508,503, filed on Jul. 23, 2009, now Pat. No. 8,397,253.

(51) Int. Cl.

| | | |
|---|---|---|
| G06F 13/00 | (2006.01) | |
| H04N 5/445 | (2011.01) | |
| H04N 21/2668 | (2011.01) | |
| H04N 21/2347 | (2011.01) | |
| H04N 21/254 | (2011.01) | |
| H04N 21/258 | (2011.01) | |
| H04N 21/44 | (2011.01) | |
| H04N 21/45 | (2011.01) | |
| H04N 21/4627 | (2011.01) | |
| H04N 21/6334 | (2011.01) | |
| H04N 21/234 | (2011.01) | |
| H04N 21/235 | (2011.01) | |
| H04N 21/239 | (2011.01) | |
| H04N 21/266 | (2011.01) | |
| H04N 21/431 | (2011.01) | |
| H04N 21/488 | (2011.01) | |
| H04N 21/658 | (2011.01) | |
| H04N 21/81 | (2011.01) | |

(52) U.S. Cl.
CPC ..... *H04N 21/2351* (2013.01); *H04N 21/2396* (2013.01); *H04N 21/23424* (2013.01); *H04N 21/2541* (2013.01); *H04N 21/25875* (2013.01); *H04N 21/25891* (2013.01); *H04N 21/26613* (2013.01); *H04N 21/4316* (2013.01); *H04N 21/44008* (2013.01); *H04N 21/44016* (2013.01); *H04N 21/4524* (2013.01); *H04N 21/4532* (2013.01); *H04N 21/4627* (2013.01); *H04N 21/4886* (2013.01); *H04N 21/63345* (2013.01); *H04N 21/6581* (2013.01); *H04N 21/8126* (2013.01)

(56) References Cited

U.S. PATENT DOCUMENTS

| | | |
|---|---|---|
| 5,774,663 A | 6/1998 | Randle et al. |
| 5,848,396 A | 12/1998 | Gerace |
| 5,910,987 A | 6/1999 | Ginter et al. |
| 5,991,736 A | 11/1999 | Ferguson et al. |
| 6,119,108 A | 9/2000 | Holmes et al. |
| 6,173,406 B1 | 1/2001 | Wang et al. |
| 6,411,939 B1 | 6/2002 | Parsons |
| 6,920,281 B1* | 7/2005 | Agnibotri ............ G11B 27/034 348/E5.108 |
| 6,944,585 B1 | 9/2005 | Pawson |
| 7,120,592 B1 | 10/2006 | Lewis |
| 7,305,347 B1 | 12/2007 | Joao |
| 7,312,803 B2 | 12/2007 | Wilkins |
| 7,360,230 B1* | 4/2008 | Paz .......................... G06F 3/14 348/E7.063 |
| 7,383,508 B2 | 6/2008 | Toyama et al. |
| 7,613,691 B2 | 11/2009 | Finch |
| 8,051,444 B2 | 11/2011 | Shkedi |
| 8,059,662 B2 | 11/2011 | Moote et al. |
| 8,095,956 B1 | 1/2012 | Brodigan et al. |
| 8,245,252 B2 | 8/2012 | Gee et al. |
| 8,270,598 B2 | 9/2012 | Lecomte et al. |
| 8,321,318 B2 | 11/2012 | Armand et al. |
| 8,510,773 B1* | 8/2013 | Abou-Rizk ........ G06Q 30/0261 725/32 |
| 8,626,626 B2 | 1/2014 | Hardison |
| 8,775,214 B2 | 7/2014 | Birbara et al. |
| 2002/0010679 A1 | 1/2002 | Felsher |
| 2002/0059591 A1 | 5/2002 | Nakagawa |
| 2002/0120927 A1 | 8/2002 | Harada et al. |
| 2002/0171670 A1 | 11/2002 | Clernock et al. |
| 2002/0194069 A1 | 12/2002 | Thakur et al. |
| 2003/0033157 A1 | 2/2003 | Dempski et al. |
| 2003/0177063 A1 | 9/2003 | Currans et al. |
| 2003/0190054 A1 | 10/2003 | Troyansky et al. |
| 2003/0229893 A1 | 12/2003 | Sgaraglino |
| 2004/0128343 A1* | 7/2004 | Mayer .................. H04L 29/06 709/203 |
| 2004/0131014 A1 | 7/2004 | Thompson, III et al. |
| 2004/0161225 A1 | 8/2004 | Dawson |
| 2004/0168184 A1 | 8/2004 | Steenkamp et al. |
| 2004/0268384 A1 | 12/2004 | Stone |
| 2005/0223109 A1 | 10/2005 | Mamou et al. |
| 2005/0235324 A1 | 10/2005 | Makipaa et al. |
| 2006/0048191 A1 | 3/2006 | Xiong |
| 2006/0074744 A1 | 4/2006 | Bodlaender et al. |
| 2006/0216003 A1* | 9/2006 | LeComte ............. H04N 7/1675 386/259 |
| 2007/0061835 A1 | 3/2007 | Klein, Jr. et al. |
| 2007/0079129 A1 | 4/2007 | Searle |
| 2008/0016537 A1 | 1/2008 | Little et al. |
| 2008/0019576 A1 | 1/2008 | Senftner et al. |
| 2008/0033826 A1 | 2/2008 | Maislos et al. |
| 2008/0109853 A1 | 5/2008 | Einarsson et al. |
| 2008/0115167 A1* | 5/2008 | Hermsmeyer ...... H04L 67/1095 725/46 |
| 2008/0148138 A1 | 6/2008 | Sparrell |
| 2008/0168489 A1 | 7/2008 | Schraga |
| 2008/0195664 A1* | 8/2008 | Maharajh .......... G06F 17/30035 |
| 2008/0219496 A1 | 9/2008 | Tewfik et al. |
| 2008/0288983 A1 | 11/2008 | Johnson et al. |
| 2008/0301750 A1 | 12/2008 | Silfvast et al. |
| 2009/0027555 A1 | 1/2009 | Hanko et al. |
| 2009/0086761 A1 | 4/2009 | Mirmobini et al. |
| 2009/0150929 A1 | 6/2009 | Park et al. |
| 2009/0183213 A1 | 7/2009 | Mukerji et al. |
| 2011/0112915 A1 | 5/2011 | Geer, III et al. |
| 2012/0057850 A1* | 3/2012 | Klappert .......... H04N 21/23424 386/278 |
| 2012/0120250 A1* | 5/2012 | Shintani ............ G06Q 30/0251 348/180 |
| 2013/0260796 A1* | 10/2013 | Hasek ..................... H04W 4/02 455/456.3 |
| 2014/0026160 A1* | 1/2014 | Shrum, Jr. ....... H04N 21/25841 725/25 |
| 2014/0366075 A1 | 12/2014 | Issa et al. |
| 2015/0365725 A1* | 12/2015 | Belyaev ............... H04N 21/458 725/46 |
| 2016/0080835 A1* | 3/2016 | von Sneidern ...... G11B 27/031 386/282 |
| 2016/0345035 A1* | 11/2016 | Han ................ H04N 21/23424 |

FOREIGN PATENT DOCUMENTS

| | | |
|---|---|---|
| JP | 2004159004 A | 6/2004 |
| WO | 0069163 A2 | 11/2000 |
| WO | 2008004189 A2 | 1/2008 |

OTHER PUBLICATIONS

Notice of Allowance from U.S. Appl. No. 12/508,503, dated Feb. 1, 2013, 8 pages.
Notice of Reasons for Refusal from Japanese patent application No. 2012-521785, dated Jan. 7, 2014, 9 pages.
Non-final Office action from U.S. Appl. No. 13/412,489, dated Nov. 6, 2014, 11 pages.
Notice of Allowance from U.S. Appl. No. 13/412,489, dated Apr. 15, 2015, 9 pages.
Non-final Office action from U.S. Appl. No. 12/508,503, dated Dec. 27, 2011, 13 pages.
Final Office action from U.S. Appl. No. 12/508,503, dated Mar. 30, 2012, 10 pages.

(56) References Cited

OTHER PUBLICATIONS

Non-final Office action from U.S. Appl. No. 12/508,503, dated Sep. 14, 2012, 10 pages.
European Search Report from European patent application No. 10 802 910.9, dated Dec. 12, 2013, 10 pages.
Non-final Office action from U.S. Appl. No. 14/815,417, dated Nov. 23, 2015, 6 pages.
Notice of Allowance from U.S. Appl. No. 14/815,417, dated Feb. 3, 2016, 8 pages.

* cited by examiner

INSERTING PERSONALIZED INFORMATION INTO DIGITAL CONTENT

RELATED APPLICATIONS

This application is a continuation-in-part of U.S. patent application Ser. No. 14/749,204, filed on Jun. 24, 2015, which is a continuation of U.S. patent application Ser. No. 13/412,489, filed on Mar. 5, 2012, now U.S. Pat. No. 9,094,695, which is a divisional application of U.S. patent application Ser. No. 12/508,503, now U.S. Pat. No. 8,397,253, filed on Jul. 23, 2009.

TECHNICAL FIELD

The subject matter of this application relates generally to methods and apparatuses, including computer program products, for inserting personalized information into digital content.

BACKGROUND

In recent years, the dissemination and availability of digital video content has grown exponentially. The development of recording and production technology such as handheld digital video cameras and advanced editing software, along with the expansion of hosting resources on the Internet, has allowed both traditional media outlets (e.g., television networks) and small, "do-it-yourself" content providers to create an array of diverse video content. In addition, the consumption of video content is no longer confined to the home computer or television set. The proliferation of portable media devices like the iPod touch® from Apple® Computer, Inc. and the PSP® from Sony® Corporation has made digital video content readily available almost anywhere.

Despite the vast number of content choices, very few sources of digital video are customized for the person viewing the content. In order for the viewer to obtain personalized content (e.g., investment performance of the user's portfolio, personal credit card transaction summary, etc.), often the user has to connect to a different source—e.g, a website requiring discrete authentication in order to access the information. This means that the user opens multiple applications and/or switches back and forth between viewing the video content and the personalized information.

The current methods of providing "personalized" digital video content can utilize techniques like overlays created with the Adobe Flash family of products. Instead of inserting the personalized data into the video content stream on a frame-by-frame basis, the content provider converts the underlying video stream into a Flash application with specialized software, often using dedicated server hardware to execute the conversion. In addition, content files in protocols such as Flash sometimes require specific plug-ins in order to be played back. Availability of these plug-ins for a specific type of device might be limited.

In light of the above, it would be desirous to develop a system and method that can provide a fully-integrated stream of digital video content and personalized information such that a user can receive the digital video and the personalized information in one content-viewing experience. It would also be desirous to develop a system and method allowing for the distribution of a single video content stream containing personalized information for many users but where each user is permitted to view only the personalized information pertaining to him as part of the content stream.

SUMMARY

The invention, in one aspect, features a computerized method for personalizing media content. A server computing device determines content data likely to be requested by a plurality of users based upon at least one of a geolocation associated with a subset of the plurality of users. The server computing device generates one or more common sets of information using the content data likely to be requested by a plurality of users, each common set of information containing content data corresponding to a geolocation. The server computing device receives a request for a digital media stream from a client device, the request including authentication data associated with a user of the client device. The server computing device generates a first set of personalized frames to be inserted into the requested digital media stream, where the personalized frames include content data specific to the user and one or more keys corresponding to a selected common set of information, the common set of information selected based upon a geolocation associated with the user. The server computing device combines the first set of personalized frames and the requested digital media stream by extracting one or more frames from the requested digital media stream and replacing the extracted frames with one or more frames from the first set of personalized frames to generate a personalized media stream. The server computing device transmits the personalized media stream to a downstream device. The downstream device generates a second set of personalized frames to be inserted into the personalized media stream, where the second set of personalized frames includes content data corresponding to the one or more keys. The downstream device combines the second set of personalized frames and the personalized media stream by extracting one or more frames from the personalized media stream and replacing the extracted frames with one or more frames from the second set of personalized frames to generate an updated personalized media stream, and transmits the updated personalized media stream to the client device.

The invention, in another aspect, features a system for personalizing media content. The system includes a server computing device and a downstream device. The server computing device is configured to determine content data likely to be requested by a plurality of users based upon at least one of a geolocation associated with a subset of the plurality of users. The server computing device is configured to generate one or more common sets of information using the content data likely to be requested by a plurality of users, each common set of information containing content data corresponding to a geolocation. The server computing device is configured to receive a request for a digital media stream from a client device, the request including authentication data associated with a user of the client device. The server computing device is configured to generate a first set of personalized frames to be inserted into the requested digital media stream, where the personalized frames include content data specific to the user and one or more keys corresponding to a selected common set of information, the common set of information selected based upon a geolocation associated with the user. The server computing device is configured to combine the first set of personalized frames and the requested digital media stream by extracting one or more frames from the requested digital media stream and replacing the extracted frames with one or more frames from the first set of personalized frames to generate a personalized media stream, and transmit the personalized media stream to the downstream device. The downstream device is configured to generate a second set of personalized frames to be inserted into the personalized media stream, where the second set of personalized frames include content data corresponding to the one or more keys. The downstream device is configured to combine the second set of personalized frames and the personalized media stream by extracting one or more frames from the personalized media stream and replacing the extracted frames with one or more frames from the second set of personalized frames to generate an updated personalized media stream, and transmit the updated personalized media stream to the client device.

The invention, in another aspect, features a computer program product, tangibly embodied in a non-transitory computer readable storage device, for personalizing media content. The computer program product includes instructions operable to cause a server computing device to determine content data likely to be requested by a plurality of users based upon at least one of a geolocation associated with a subset of the plurality of users. The computer program product includes instructions operable to cause the server computing device to generate one or more common sets of information using the content data likely to be requested by a plurality of users, each common set of information containing content data corresponding to a geolocation. The computer program product includes instructions operable to cause the server computing device to receive a request for a digital media stream from a client device, the request including authentication data associated with a user of the client device. The computer program product includes instructions operable to cause the server computing device to generate a first set of personalized frames to be inserted into the requested digital media stream, where the personalized frames include content data specific to the user and one or more keys corresponding to a selected common set of information, the common set of information selected based upon a geolocation associated with the user. The computer program product includes instructions operable to cause the server computing device to combine the first set of personalized frames and the requested digital media stream by extracting one or more frames from the requested digital media stream and replacing the extracted frames with one or more frames from the first set of personalized frames to generate a personalized media stream, and transmit the personalized media stream to a downstream device. The computer program product includes instructions operable to cause the downstream device to generate a second set of personalized frames to be inserted into the personalized media stream, where the second set of personalized frames include content data corresponding to the one or more keys. The computer program product includes instructions operable to cause the downstream device to combine the second set of personalized frames and the personalized media stream by extracting one or more frames from the personalized media stream and replacing the extracted frames with one or more frames from the second set of personalized frames to generate an updated personalized media stream, and transmit the updated personalized media stream to the client device.

Any of the above aspects can include one or more of the following features. In some embodiments, the server computing device encrypts the content data specific to the user using the authentication data. In some embodiments, the downstream device encrypts the content data corresponding to the one or more keys using the authentication data.

In some embodiments, the downstream device is a cable head-end, a router, a modem, a content cache, a cell tower, or a client computing device. In some embodiments, the frames containing the one or more keys are fewer than the frames containing the content data specific to the user. In some embodiments, the step of determining content data likely to be requested by a plurality of users comprises analyzing a temporal characteristic associated with the content data and selecting content data based upon the temporal characteristic.

In some embodiments, the geolocation associated with the user comprises a zip code stored in a user profile for the user, a location of the client device, or both. In some embodiments, the step of generating a second set of personalized frames to be inserted into the personalized media stream comprises extracting the one or more keys from the personalized media stream, retrieving content data corresponding to the one or more keys, and generating the second set of personalized frames using the content data corresponding to the one or more keys. In some embodiments, the downstream device retrieves the content data corresponding to the one or more keys from a local storage device.

In some embodiments, the downstream device is logically coupled between the server computing device and the client device so that data transmitted from the server computing device travels through the downstream device before reaching the client device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

In general overview, the techniques described below includes methods and apparatuses that are for inserting personalized information into digital content. The techniques are related to extracting frames of digital video and/or audio from a video content stream and embedding frames of personalized information into the video stream.

Figure 1:
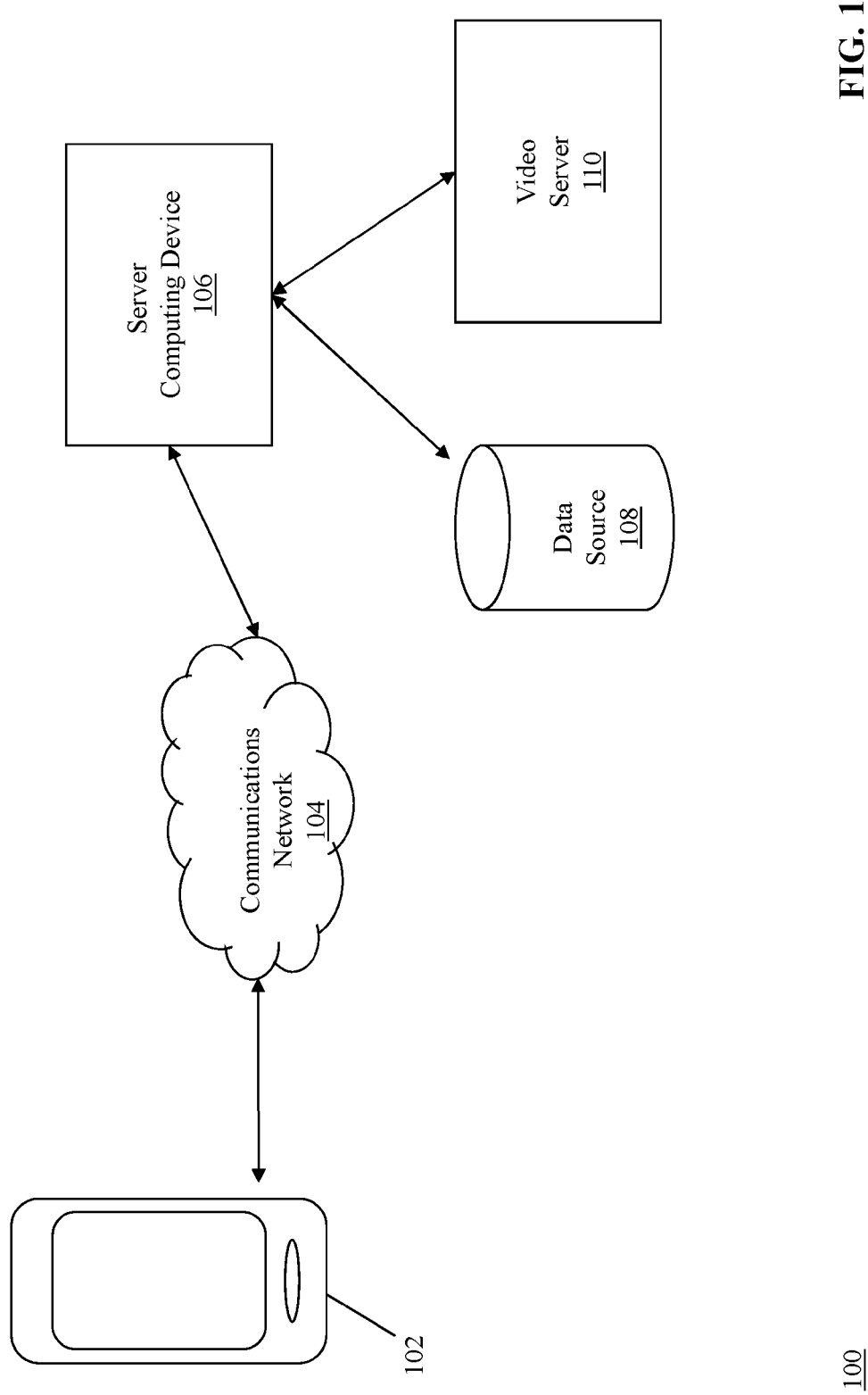
FIG. 1 is a block diagram of an exemplary system for inserting personalized information into digital content.

FIG. 1 is a block diagram of an exemplary system 100 for inserting personalized information into digital content. The system 100 includes a client computing device 102, a communications network 104, a server computing device 106, a data source 108, and a video server 110. The server computing device 106, data source 108, and video server 110 can reside at the same physical location or may be dispersed to multiple physical locations. The server computing device 106, data source 108, and video server 110 can be integrated into the same physical device. Alternatively, or in addition the server computing device 106, data source 108, and/or video server 110 can be distributed over many devices. The server computing device 106, data source 108, and video server 110 can communicate via a communications network, e.g., communications network 104.

The client computing device 102 is the hardware that displays the personalized video content to a user. Example computing devices take on many forms, including but not limited to a personal computer, a standalone video player, a home video game console, a portable video game system, a personal digital assistant (PDA), an internet appliance, a digital video recorder (DVR), a smart phone, a set-top box, or the like. The client computing device 102 includes network-interface components to enable the user to connect to a communications network 104, such as the Internet. The computing device 102 also includes digital content viewing and playback plug-ins or standalone software to enable the user to view both digital content (e.g., video and audio) and personalized information received over the communications network 104. The digital content playback software can be customized to play back only personalized video content received from the server computing device 106. Alternatively, the digital video content playback software can play back many different forms of content; such examples include Microsoft® Windows Media® Player, Adobe® Flash® Player, QuickTime® from Apple® Computer, Inc., or other similar applications.

The server computing device 106 communicates with the client computing device 102 via a communications network, e.g., communications network 104. The server computing device 106 receives requests for personalized video content from the client computing device 102. The server computing device 106 can generate a personalized video content stream for transmission to and playback on the client computing device 102.

The communications network 104 channels communications from the client computing device 102 to the server computing device 106 and back. The network 104 may be a local network, such as a LAN, or a wide area network, such as the Internet or the World Wide Web.

The data source 108 holds personalized information related to the user of the client computing device 102. When the server computing device 106 receives a request for video content from the client computing device 102, the server 106 can retrieve information from the data source 108 pertaining to that user for insertion into the personalized video content stream. Although one data source 108 is shown, there can be multiple data sources in the system 100. The data source 108 need not be a computing device hosting database applications, as in the traditional sense. In some examples, the data source 108 can be a communication link to sensors, GPS-enabled mobile devices, or other devices which can transmit data directly to the server 106 as that data is collected. In other examples, the data source 108 can be a data feed received from various commercial entities which collect and make the requisite data available for retrieval by the server 106. In still other examples, the data source 108 is a computing device hosting database applications.

The video server 110 hosts video content for use by the server computing device 106. When the server computing device 106 receives a request for video content from the client computing device 102, the server 106 can locate the requested video content on the video server 110 to generate the personalized video content stream. The video content can take a variety of forms. The video content can be a 'live' stream. The video content can be a pre-recorded stream or clip. The video content can be short-form content, i.e., a four-minute music video. The video content can be long-form content, i.e., a thirty-minute television program. In some examples, the video content is a user-submitted amateur video or video podcast. In other examples, the video content is a professional television show, motion picture, webcast, music video or other similar content. The video content can be an advertisement (e.g., a commercial) or other promotional content. In some examples, the video content can exist in a standard compression protocol, such as MPEG-2 or MPEG-4. Alternatively, the video content can exist in a customized and/or proprietary compression protocol.

Figure 2:
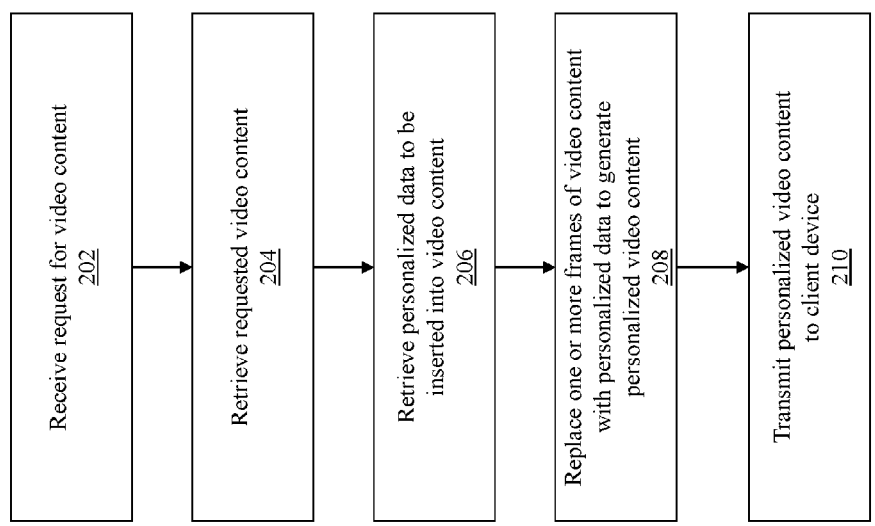
FIG. 2 is a flow diagram of an exemplary method for inserting personalized information into digital content.

FIG. 2 is a flow diagram of an exemplary method for inserting personalized information into digital content. The server computing device 106 receives (202) a request for video content from a client computing device 102 associated with a user. The server 106 retrieves (204) personalized information to be inserted into the video content from one or more data sources 108. The server 106 also retrieves (204) the requested video content from the video server 110. The retrieving steps 204 can be performed in parallel or in any order. The server 106 inserts the personalized information into the digital video content to generate personalized video content by replacing (208) one or more frames of video content with personalized information. The server 106 then transmits (210) the personalized video content to the client computing device 102 for playback to the user.

In some examples, the request sent from the client computing device 102 can include authentication data associated with the user and in other examples, the authentication data can be received before or after the request for the video content. The authentication data can comprise a username, password, personal identification number (PIN), digital certificate, pass code, or other similar credentials used to identify the user. A preferred embodiment, although not required, would incorporate two or more of the authentication data types in combination to identify the user. The server 106 can use the authentication data to determine whether to retrieve personalized information for the user, and if so, what types and quantity of personalized information to retrieve. In one example, the server 106 can create a secure cookie associated with the client device 102 to ensure that the user only has access to his personalized data. In another example, the user may decline to supply authentication data as part of the request. As a result, the server 106 may not retrieve any personalized information and instead send the unmodified video content back to the user. In other examples, the server 106 may determine that the user can be authenticated to only a discrete subset of available data sources (e.g., data source 108) or a discrete subset of data elements found in one or more data sources. The server 106 could then insert personalized information retrieved from the subset of data sources or data elements, whereas another user whose authentication data allows the server 106 full access to all available data sources may receive a much broader range of personalized information.

In some examples, the server 106 can receive a request for video content from a client 102 and determine a characteristic associated with the video content. In some examples, the request and/or the video content can include a 'tag' or other embedded indicia that identifies the characteristic. In other examples, the server 106 can conduct a speech or text analysis of the video content in order to determine the characteristic. The characteristic can be broad in scope (e.g., genre or subject matter of the video) or the characteristic can be more narrow (e.g., specific persons or companies named in the video). For example, the requested video content may generally discuss recent stock market trends or the latest corporate mergers. Upon receiving the request and/or retrieving the requested video content from the video server 110, the server 106 can determine that a characteristic of the video content is its financial subject matter. In another example, the server 106 can utilize speech recognition techniques to analyze the audio component of the video content and conclude that a person in the video is referring to Fidelity Corporation. As a result, the server 106 can determine that a characteristic of the video content is its mention of Fidelity.

In some examples, the server 106 can use the identified characteristic to retrieve personalized information that is both associated with the user and related to the characteristic in some way. For example, the server 106 could retrieve a current stock quote of Fidelity Corporation based on the server's 106 identification of Fidelity as a characteristic of the video content and the server's 106 determination that the requesting user holds shares of one or more Fidelity mutual funds in his brokerage account. In other examples, the server 106 could retrieve a recent portfolio transaction summary for the user based on a video content characteristic of general investment advice and the server's 106 determination that the user has a portfolio with Fidelity Investments.

In other examples, the server 106 does not need to identify a characteristic of the video content or associate an identified characteristic with the personalized information. The video content and the personalized information do not have to contain any similarity in subject matter or any other characteristic. For instance, the server 106 can retrieve a recent credit card transaction history for the user from the data source 108 upon receiving a request for a recent episode of a national network sitcom.

In determining what types of personalized information to retrieve from the data source 108, the server 106 can determine if the user has specified any personalized information preferences. In some examples, the preferences can be specified in the request received from the client computing device 102, or the preferences can be part of a user profile stored in a data source 108 and retrieved by the server 106 when a video content request is received from that particular user. For example, the user could specify as a preference that he always wants to see his current bank account balance when he requests any video content. Thereafter, when the server 106 receives a video content request from that user, the server 106 can consult a data source 108 containing the preference and retrieve his balance information in generating the personalized video content.

In some examples, the user profile can include various types of information related to the user (e.g., demographics, finances, interests, etc.) and associated with a specific entity (e.g., Fidelity Investments.). The entity can be the same entity that distributes the video content. For example, the user could hold a Fidelity mutual fund account, and the user profile could contain information regarding the account. In other examples, the user profile can include information from third-party sources such as, for example, credit card companies, banks, social networking websites, email services, etc. The user profile can include information entered by the user and information retrieved from internal and/or external data sources. The user profile can be configurable by the user via a network application (e.g., a web page). The user could log in and update his user profile associated with delivery of video content. For example, the user could log in to his Fidelity account page and he could see that his Fidelity account is associated with two credit cards (e.g., one for his own use and one for his wife's use). The user could configure his user profile to restrict the display of personalized information so that only information associated with the credit card for his own use appears when he requests video content.

Figure 3:
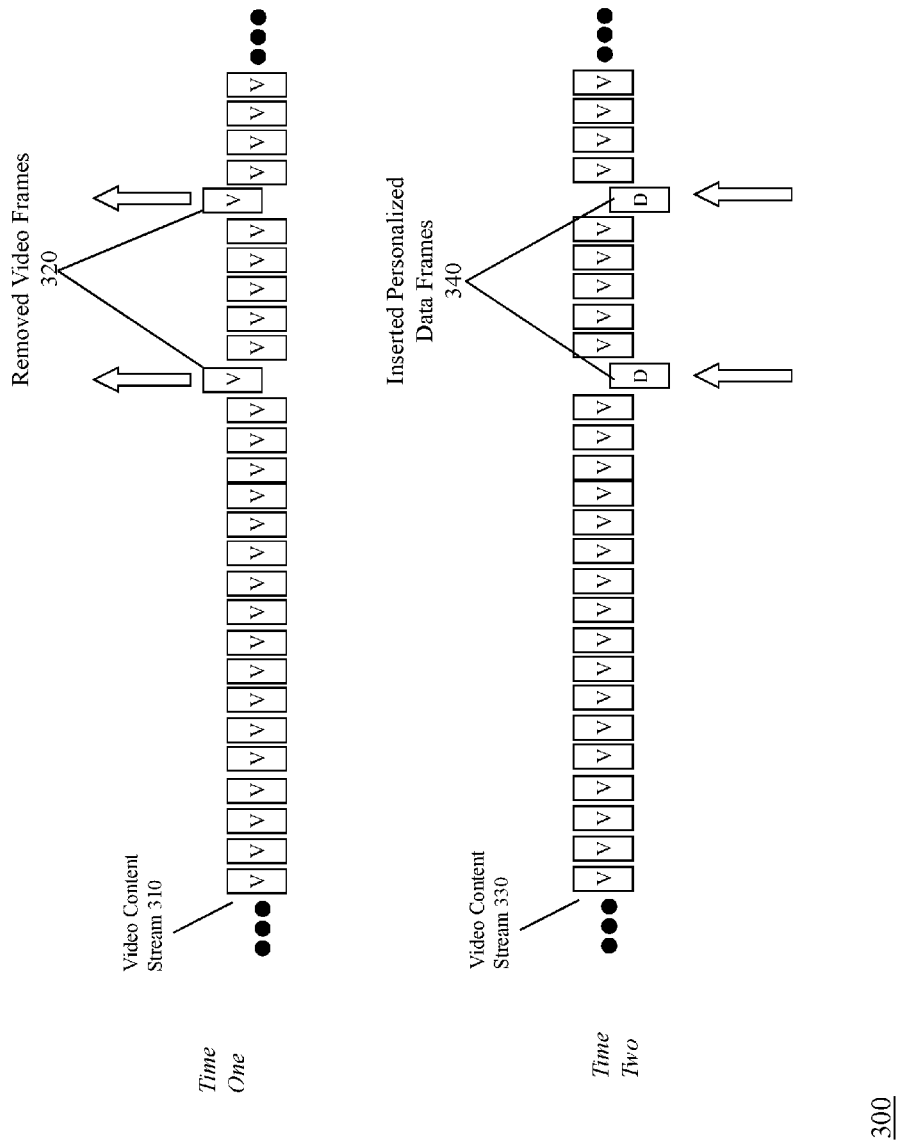
FIG. 3 is a diagram of exemplary frame extraction and insertion for inserting personalized information into digital content.

After the server 106 retrieves the requested video content and the personalized information, the server 106 generates the personalized video content by replacing one or more frames of the digital video content with the personalized information. FIG. 3 is a diagram 300 of exemplary frame extraction and insertion for inserting personalized information into digital content.

Generally, traditional video compression techniques operate using the concept of 'frames.' A video content stream is usually divided up into raw, uncompressed frames, which are then compressed by using an algorithm to identify and eliminate many of the redundant data between frames. The resulting compressed frame is then classified as a specific type of frame. For example, the MPEG-2 compression protocol uses intra-coded frames (I-frame), predictive-coded frames (P-frames), and bidirectionally-predictive-coded frames (B-frames). When a media player or other device receives the compressed video content, the player applies the reverse algorithm to restore each frame to substantially the same as the corresponding raw frame in order to display the content.

Similar techniques can be associated with the claimed invention, as shown in FIG. 3. At time one, the server 106 has retrieved the personalized information and at least a portion of the requested video content stream 310. The server 106 can determine one or more video content frames 320 to remove from the video content stream. In some examples, the server 106 can determine which video frames to remove based on considerations such as, for example, impact to the overall video quality, continuity of the video content, buffering capacity, or other similar considerations. In other examples, the video stream 310 may have pre-assigned frames that can be extracted or 'empty' frames in which the server 106 can insert the personalized information.

Once the server 106 has removed the identified video frames 320, at time two the server 106 can convert the personalized information into frames 340 that comply and/or can be integrated with a data compression protocol and insert the frames 340 at the locations in the video content stream 330 where the video frames have been removed.

In some examples, the server 106 can also encrypt the personalized information either before or after converting the information into frames 340 and inserting the frames 340 into the video content stream 330. Due to the sensitive nature of some types of personalized data such as financial records, the server 106 can apply known encryption techniques to the personalized information so that a person who inadvertently or purposefully intercepts the transmitted video content cannot gain access to the personalized data contained therein. The server 106 can also use the authentication data received from the user as part of the data encryption techniques. The client computing device 102 can receive the encrypted video content and subsequently decrypt the content for purposes of displaying the video and personalized information to the user.

In some embodiments, as part of the receipt and display of video content, the server 106 can create an individualized session (or 'tunnel') between itself and the client computing device 102. During the session, the personalized video content is transmitted from the server 106 to the client 102 in a streaming fashion, and the server 106 can dynamically change the personalized data 'mid-stream.' For example, the user could request video content associated with a financial news network. The server 106 can receive the request, retrieve the video content, and insert personalized data regarding news headlines for companies whose stock the user currently owns. The server 106 can transmit the personalized video content to the client computing device 102, creating a session. During playback of the video content, one of the stocks contained in the user's account could reach a certain benchmark (e.g., reach a 52-week high price). The server 106 could detect this benchmark, and insert a price alert as personalized data into the video content while the user is watching the content. When the price alert reaches the client computing device 102, the device 102 no longer displays the news headlines but instead displays the alert to the user. In other examples, the device 102 could prompt the user for confirmation before displaying the alert. If the user indicates that he does not want to view the alert, the server 106 would continue providing the news headlines as personalized information. The technique of dynamically changing personalized information during playback of the video content has the advantage of providing up-to-date information to the user, creating a more useful and interesting video content experience.

In other examples, the server 106 can check the size and integrity of the data frames 340 placed into the video content stream 330. Example data integrity techniques known in the art, such as hashing, can be used to perform the check.

Figure 4:
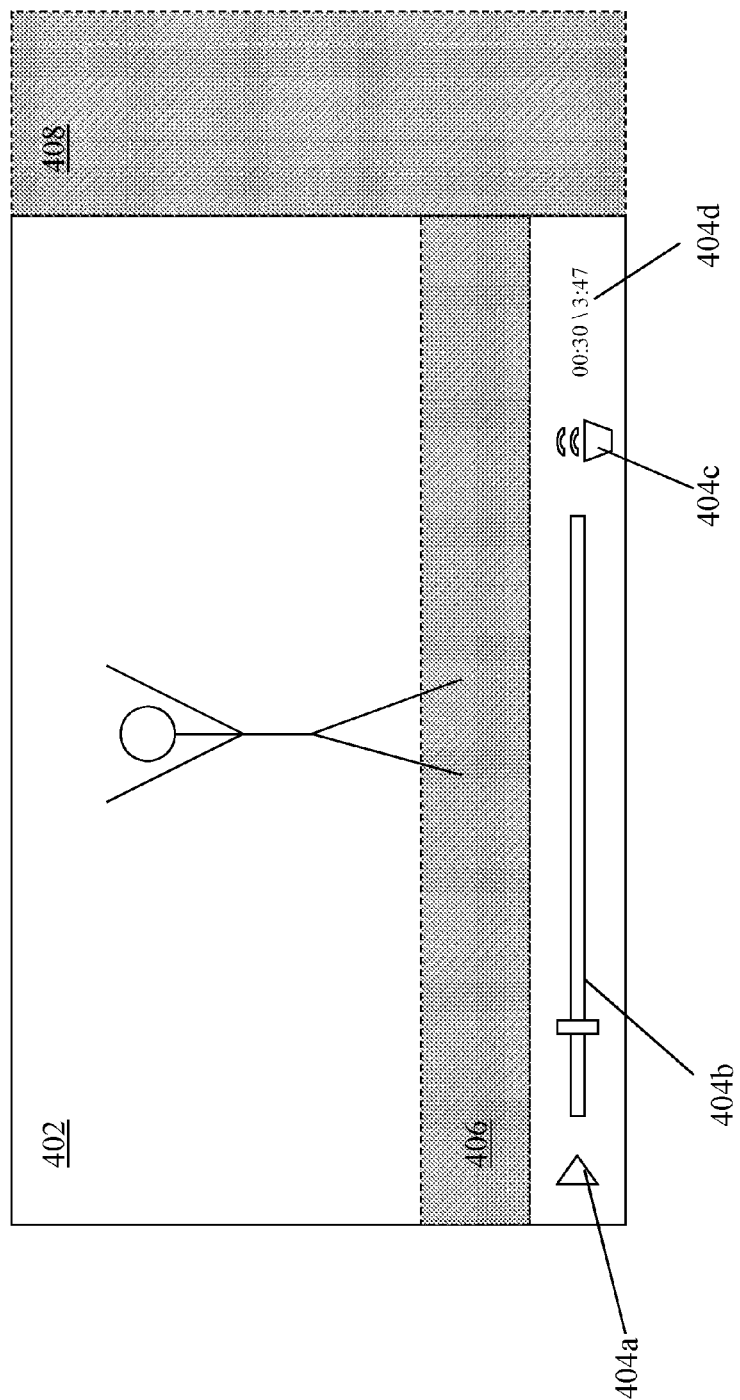
FIG. 4 is a depiction of a media player for display of personalized video content on a client device.

FIG. 4 is a depiction of a media player 400 for display of personalized video content on a client device (e.g., client computing device 102). The media player 400 can be a customized software application designed for compatibility with the personalized video content. The media player 400 includes a video content display area 402, and playback controls such as a play/pause button 404a, a scrubber bar 404b, a volume control 404c, and a time indicator 404d (collectively playback controls 404). The media player 400 also includes pop-in window area 406 and a fly-out window area 408, preferably hidden from view when the video content playback begins. A pop-up window (not shown) that is separate from the media player 400 can also be included. The pop-in window 406, fly-out window 408, and/or the pop-up window can be used to display the personalized information, as described in greater detail below.

Figure 5:
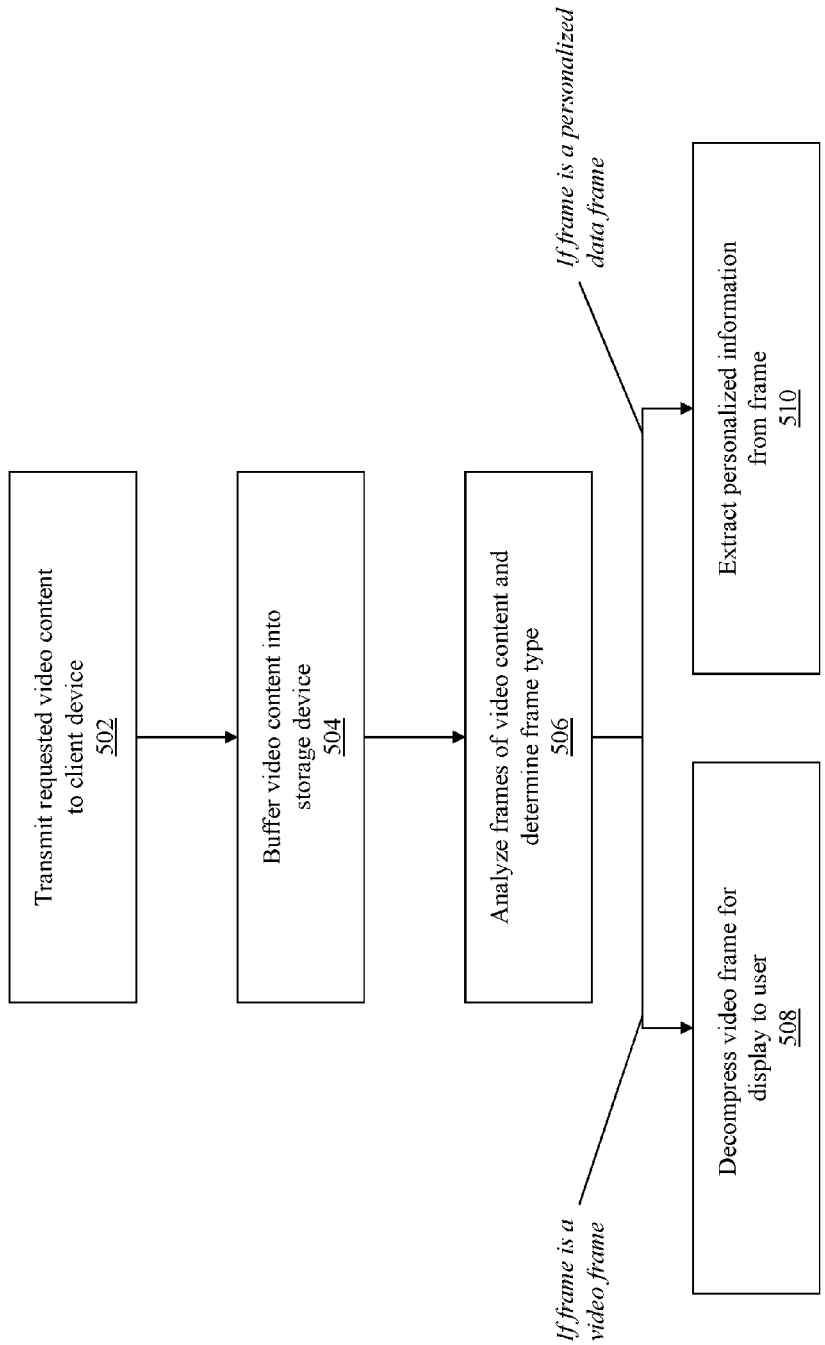
FIG. 5 is a flow diagram of a method for displaying the personalized video content to the user via a media player

FIG. 5 is a flow diagram of a method for displaying the personalized video content to the user via a media player, e.g., media player 400. Once the server 106 has generated the personalized video content, the server 106 transmits (502) the video content to a client computing device 102 associated with the requesting user. The client device 102 displays the video content and personalized information to the user via the media player 400 located on the client device 102. Upon receiving the personalized video content for playback, the media player 400 buffers (504) the content into a temporary storage buffer (e.g., a memory or other storage device located on the client device 102). During the buffering process, the media player 400 analyzes (506) the frames of the personalized video content and determines the type of frame (e.g., I-frame, P-frame, B-frame or personalized data frame). If the type of frame is associated with the video content, the media player 400 decompresses (508) the frame back into the raw form so the frame can be displayed to the user and places the frame into the buffer. If the type of frame is associated with the personalized information, the media player 400 extracts (510) the personalized information from the frame and stores the information in a storage device for use during playback of the video content.

In some examples, the media player 400 receives the personalized video content from the server device 106 in an encrypted form. In other examples, only the frames in the personalized video content stream which are associated with the personalized information are encrypted. The media player 400 can decrypt the personalized video content based on a predefined encryption algorithm. Decryption can also be performed by the media player 400 in conjunction with authentication of the user. For example, the media player 400 can use authentication credentials received from the user, the server device 106, and or retrieved from the client device 102 as part of the decryption techniques. In other examples, the media player 400 can request the user to provide authentication credentials before playback of the video content begins. In still other examples, the media player 400 can authenticate the user by communicating with the server device 106 to confirm the identity and authorization of the user to view the requested content. The media player 400 can cancel playback of the requested video content if authentication of the user and/or decryption of the personalized video content is not successful. Alternatively, the media player 400 can limit or cancel display of only the personalized information if authentication and/or decryption is not successful, and continue with playback of the video content stream.

When the media player 400 begins playback of the personalized video content, the video content stream is displayed in the video content display area 402. The user can manipulate the playback controls 404 to affect the display or other characteristics of the video (e.g., volume). When the video completes, the user can opt to restart the video from the beginning, or use the scrubber bar 404b to 'rewind' the video to a specific point.

During playback of the video content, the media player 400 can also display the personalized information. The media player 400 can use the pop-in window 406 to display a portion of the personalized information within the boundaries of the video content display area 402. In some examples, the pop-in window can completely obstruct the user's view of the video content. In other examples, the pop-in window 406 can be transparent or opaque, allowing the user to see the video content underneath. The pop-in window 406 can appear for a predetermined amount of time (e.g., ten seconds) before automatically disappearing, or the pop-in window 406 can appear continuously throughout the playback of the video until the user takes action (e.g., clicks a button in the media player 400 or presses a key on the client device 102) to remove the pop-in window 406. Once the pop-in window 406 is closed, a button can appear which allows the user to re-open the pop-in window. The pop-in window 406 can be triggered to appear based on a specific time reference point in the video content. For example, the media player 400 can display the personalized information in the pop-in window 406 when the elapsed time of the video content reaches, e.g., 02:25. In other examples, the pop-in window 406 can be triggered to appear based on the currently displayed video content.

In similar fashion, the media player 400 can use the fly-out window 408 to display a portion of the personalized information outside of the boundaries of the video content display area 402. The fly-out window 408 can appear at the top, bottom, or sides of the video content display area 402. The fly-out window can also appear somewhere else on the screen not attached to the video player and/or in a separate window, like a pop-up window. The fly-out window 408 can have the same characteristics as the pop-in window 406 described above.

Figure 6:
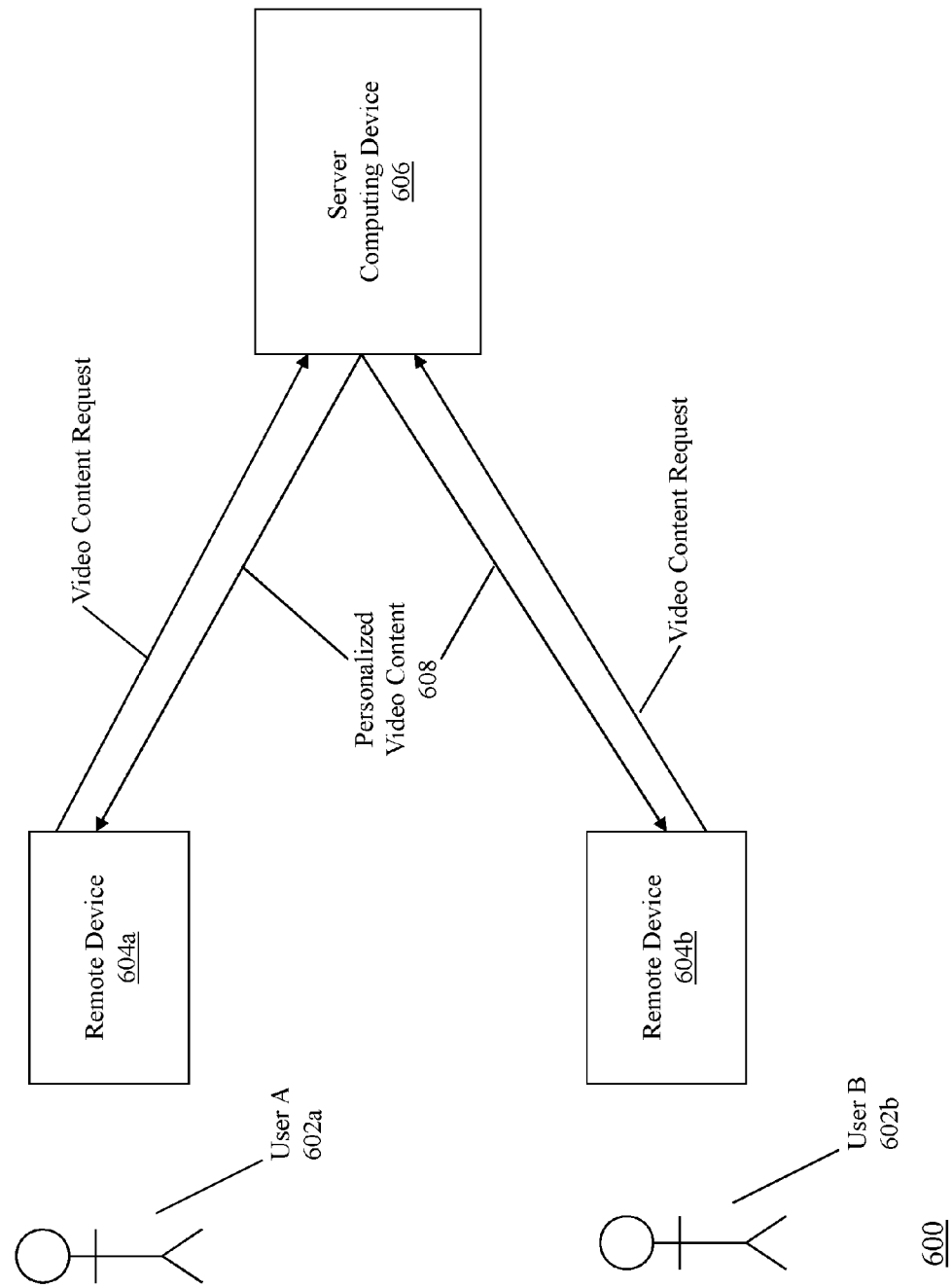
FIG. 6 is a block diagram of a system for inserting personalized information of a plurality of different users into digital content.

In other embodiments of the claimed invention, the server 106 can retrieve personalized data for a plurality of users and generate a single personalized video content stream for transmission to the plurality of users. The server 106 can thereby avoid having to generate a personalized video content stream for each user in a group of users requesting the same video. FIG. 6 is a block diagram of a system 600 for inserting personalized information of a plurality of different users into digital content.

For example, User A 602a and User B 602b are both holders of shares in a particular mutual fund (e.g., Freedom Fund offered by Fidelity Corporation). User A is associated with client computing device 604a and User B is associated with client computing device 604b. The client computing devices 604a and 604b communicate with the server device 606. In a case where the data is not confidential data, such as the performance data of the Freedom Fund, this data is transmitted to both User A 602a and User B 602b in an unencrypted form and displayed to each user in their corresponding video players as described above.

Figure 7:
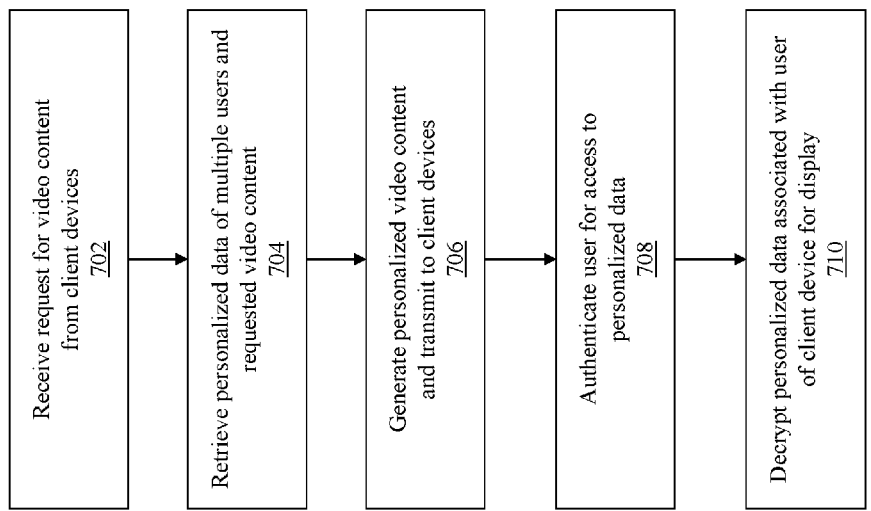
FIG. 7 is a flow diagram for inserting personalized information of a plurality of different users into digital content.

FIG. 7 is a method 700 for inserting personalized information of a plurality of different users into digital content. Upon logging in to Fidelity's web site via communication with, e.g., the server device 606, the users 602a and 602b are each presented with a link to video content associated with the Freedom Fund. Both User A 602a and User B 602b click the link to request (702) the video content 608 from the server computing device 606. As described above, the server device 606 can retrieve (704) the video content from a video server (e.g., video server 110) and the personalized information (e.g., current share value) from a data source (e.g., data source 108) for all persons holding shares in the Freedom Fund. The server device 106 can generate (706) personalized video content 608 by replacing video frames from the video content with frames containing the personalized information of all persons.

The server device 606 transmits the same personalized video content stream 608 to each user 602a and 602b. In some examples, the users receiving the transmission may have all registered to receive a Web seminar on the Freedom Fund scheduled to be displayed at a specific time. In other examples, the users receiving the transmission may have all requested the transmission within the same time period, for example, all within 20 seconds of each other, and therefore receive the transmission as a multicast transmission for ease of distribution. When the content stream 608 is received by the respective client devices 604a and 604b, the media player on each device extracts the personalized information from the content stream 608. In some examples, the media player can determine the identity of User A 602a by authenticating (708) User A based on credentials associated with User A. Once User A 602a is authenticated, the media player can extract only the personalized information associated with User A that is contained in the video content stream 608. In some examples, the media player can also decrypt (710) the personalized information using a decryption technique and based on the authentication credentials. Similarly, the media player on the client device 604b of User B 602b can authenticate User B and extract only the personalized information associated with User B that is contained in the video stream 608. Both User A 602a and User B 602b view the same requested video content, but according to the above techniques, each user 602a and 602b sees, for example, his or her personal current share value displayed and not the share value of any other user during video playback. These techniques can be applied to any number of different users, affording the content provider a great deal of processing efficiency while still retaining the private nature of the personalized information.

In some instances, many users may request personalized content that comprises the same news events, companies, stock symbols, and so forth as requested by other users. For example, many different investors may wish to track the market/stock performance of a common set of indices or companies (e.g., AAPL, IBM, F) because these companies are large, well-known, indicative of the overall market, or for other reasons. In another example, many users may want to receive news and status updates on the presidential election cycle because it is an event of wide impact and common interest. However, requiring the server 106 to insert the same set of personalized information into individual video streams for many different users or groups can be inefficient both from a computational resources perspective and a bandwidth perspective because the server 106 must separately insert a common set of personalized information for each user's video content and transmit the personalized video stream to each user's device.

Figure 8:
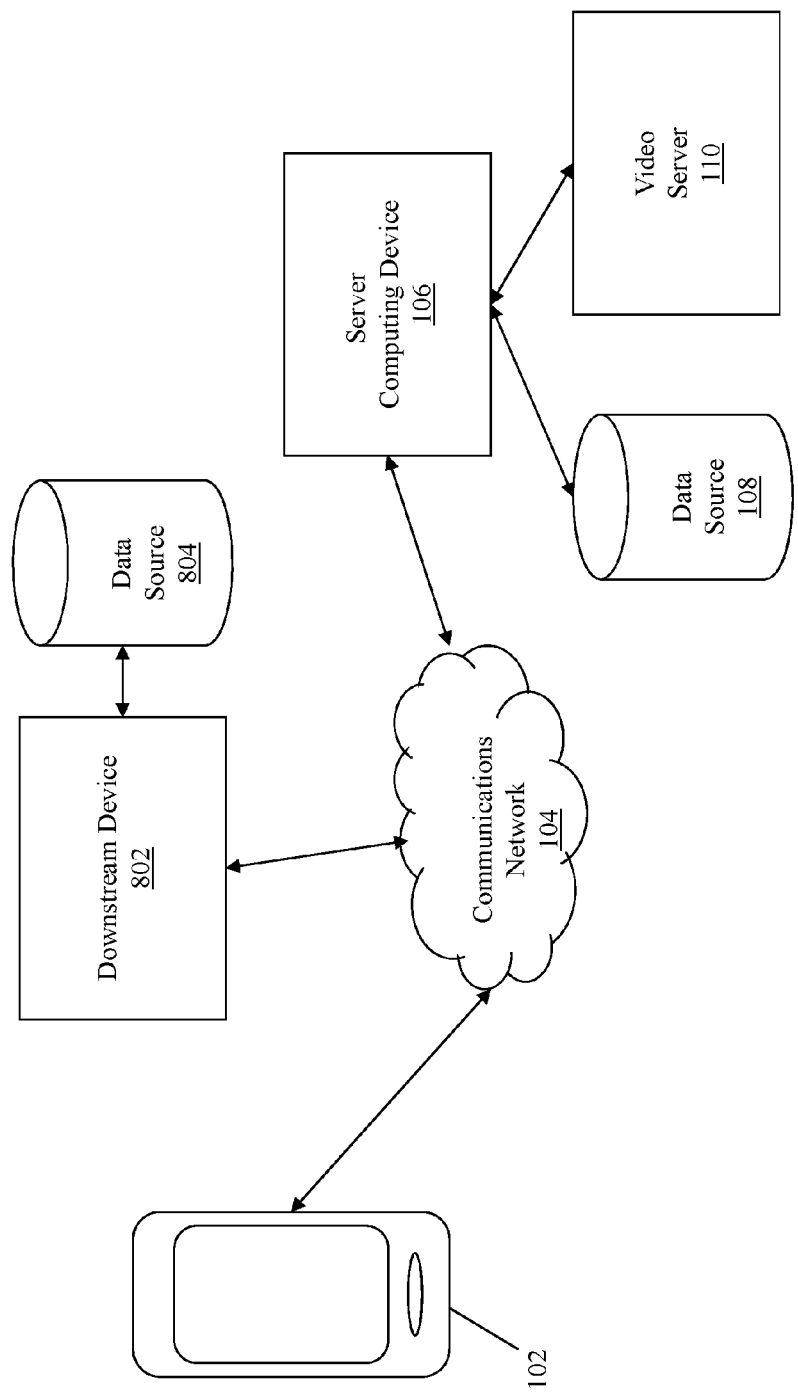
FIG. 8 is a block diagram of an exemplary system for inserting personalized information into digital content using a downstream device.

The invention described herein can advantageously determine or predict a common set of popular or frequently-requested personalized information and designate the common set of information as a baseline part of the requested video content. FIG. 8 is a block diagram of an exemplary system 800 for inserting personalized information into digital content using a downstream device. As shown in FIG. 8, the system 800 includes a client computing device 102, a communications network 104, a server computing device 106, a data source 108, and a video server 110 which have been described previously with reference to the system 100 of FIG. 1. Also included in the system 800 of FIG. 8 is a downstream device 802 which is coupled to the communications network 104 in between the client computing device 102 and the server computing device 106, and includes a data source 804. In some embodiments, the downstream device 802 is an intermediary device that receives network traffic from the server 106 that is destined for the client device 102 and also receives network traffic from the client device 102 that is destined for the server 106. Exemplary downstream devices include but are not limited to routers, cable head-ends, modems, access points, cell towers, or other similar devices.

As such, the server 106 can distribute the common set of information to multiple different locations in the content network, such as cable head-ends, routers, content caches (i.e., as found in content delivery networks (CDNs)), in-home computing devices, or other "last mile" or downstream devices 802 so that the server 106 does not have to provide the common set of information each time it serves a personalized video stream to a client device 102. Instead, the server 106 only needs to insert the subset of personalized information that is truly unique to the individual requesting the content and/or is not commonly requested by other users and further include keys (or tags) that reference the common set of information to be inserted by the downstream device 802. Because the tags or keys are smaller in size than the personalized information, the keys require fewer frames of video content to be removed at the server 106. As a result, the server 106 has the flexibility to insert a greater amount of personalized information that is specific to the requesting user (e.g., by removing the same or similar number of frames as it would previously) and/or remove fewer frames (thereby increasing the processing efficiency of the server 106).

When the downstream device 802 receives the personalized video content, the downstream device 802 can analyze the personalized frames and determine the set of keys included in the personalized frames for which personalized information is required. The downstream device 802, having pre-stored the common set of information referenced by the keys, can quickly retrieve the corresponding personalized information from a local storage (e.g., data source 804) and remove frames from the video content to insert the necessary set of information.

The server 106 can use any number of prediction methods to determine the make-up of the common set of information described above. In one example, the server 106 can analyze a history of personalized information requested by users and determine a frequency of certain information within the requests (i.e., five thousand users have requested the current price of GOOG stock within the last thirty days). In another example, the server 106 can evaluate the popularity of certain information at third-party sites and select a subset of that information to include in the common set (i.e., #SuperBowl is trending on Twitter in late January, so the system collects the latest tweets, Associated Press news items, website URLs from search engine results, and so forth that relate to the hashtag). In another example, users may establish accounts with the server 106 that include a personal profile identifying the personalized information they would like to receive in their requested video content. The server 106 can continually analyze the user profiles for all or many of the users and determine a set of personalized information that is common to the analyzed user profiles.

In another example, geolocation of users can be leveraged by the server 106 to predict what pieces of personalized information ought to be included in the common set of information. For example, the server 106 can aggregate users into a particular geographic region based upon, e.g., the zip code stored in each user's profile, and then associate the geographic region with certain events or information elements that are predicted to be relevant to users in that geographic region (e.g., yesterday's sports scores and statistics for regional teams, local news headlines, upcoming calendar of events, and so forth). That way, the server 106 can prepopulate the common set of information for a particular geographic area with certain data points that are likely to be relevant to users associated with that area.

The server 106 can also refer to geolocation attributes of the users that are more dynamic. For example, if a user requests a personalized content stream while located in a geographic area that is not the user's home or default location as denoted in the user's profile, the server 106 can receive geolocation information (e.g., GPS coordinates) from the user's mobile device (e.g., client computing device 102) and select a common set of information generated for other users in the similar geographic region when populating the content stream for the user. In some embodiments, the server 106 can select data elements from the common sets of information from both the user's "home" location (from the user profile) and the user's present location (as identified via the mobile device) to generate a hybrid common set of information that may be applicable to not only the current user—but also can be leveraged for other users that share those geographic characteristics.

In another example, the server 106 can utilize temporal aspects of information to prepopulate the common set of information in advance of certain events. For example, the server 106 can determine that today's date is the first Tuesday in November in a presidential election year in the United States. As a result, the server 106 can add election results and related news stories to the common set of information, as it is likely that many users will want to have this information provided in a personalized content stream. Again, the geolocation techniques described above can be used to augment the common set of information based upon a user's location (e.g., include local election results in the common set of information for users in particular geographic regions/zip codes).

It should be appreciated that the server 106 can populate the common set of information automatically based upon the predictive aspects described above. For example, if the server 106 determines that the current date is a Sunday in November and the current time is 7:30 pm eastern, the server 106 can automatically retrieve a list of the day's professional football scores and store that information in the common set of information to be distributed to downstream devices (as described herein) in advance of any user requesting a personalized content stream. As a result, the information is ready to be retrieved for a user prior to the first request, making the system operate in a more efficient manner.

In another example, the server 106 can apply predictive sampling and/or filtering techniques to the larger set of personalized information that has been (or may be) requested by users in order to identify what is the most likely information that will be included in the common set of information. For example, the server 106 can generate a Bloom filter to be stored in the database (e.g., data source 108) that refers to a baseline set of common information and when subsequent personalized information elements are captured, the server 106 can compare the subsequent elements using the Bloom filter to see whether these elements either are already likely to exist in the common set of information or not. If the elements are likely to exist, then the server 106 may simply decline to process the elements into the common set of information, thereby saving processing time and improving the efficiency of the system. If the elements are not likely to exist, the server 106 can determine whether to include the new personalized information element into the common set of information—and update the Bloom filter. Other sampling/filtering techniques can be used to determine the common set of information or verify elements for inclusion in the common set of information—such as a count-min sketch, a quotient filter, or a skip list.

The common set of information can be referenced by keys. In one embodiment, a key is a text string that indicates a type and identity of the personalized content. Examples include:

Type {News}|ID {Pope Francis}=retrieve news articles relating to Pope Francis;

Type {Stock}|ID {NFLX}=retrieve the current stock price for Netflix;

Type {Event}|ID {2016 Election}=retrieve a variety of different information (e.g., social media interactions, news articles, links to YouTube® videos, etc.) relating to the 2016 presidential election.

As mentioned above, geolocation can be introduced as an element of the keys to provide a more granular, yet still widely applicable, common set of information. Examples of such keys include:

Type {Sports}|ID {New England Patriots}|Location {<Massachusetts zip codes>}=retrieve the score of yesterday's Patriots game along with certain statistics (e.g., Tom Brady's passing yards and touchdowns).

The server 106 can generate a list of keys corresponding to the common set of personalized information (or aggregate the keys into a data element like an XML file) and store the list of keys in a database. The server 106 can also transmit the list of keys to the downstream device(s) 802 for reference by those devices. It should be appreciated that the keys can comprise many different syntaxes and/or forms without departing from the scope of the invention described herein. The server 106 also can retrieve the actual content that is included in the common set of information (e.g., stock prices, news headlines, URLs, social media posts, and so forth) and store the actual content locally. In addition, the server 106 can transmit the actual content to the downstream device(s) 802 for storage by those device(s). In some embodiments, the retrieval and transmission of the actual content to the downstream device(s) can occur periodically to alleviate a constant load on the network.

Also, in some embodiments, the server 106 and/or the downstream devices 802can generate the keys using a cryptographic algorithm such that the keys incorporated into a user's personalized content stream are protected from unauthorized access by others, and are unique to the user receiving them.

As a result of the above-described processing, the downstream device 802 is configured to (i) analyze a personalized video stream received from the server 106 and destined for the client computing device 102, (ii) extract the list of keys in the personalized video stream that represent the common set of information, (iii) insert personalized frames into the video stream that include the content corresponding to the list of keys by retrieving the content from a local storage device and generating personalized frames that include the content, and (iv) transmitting the updated personalized video stream to the client device 102.

Figure 9:
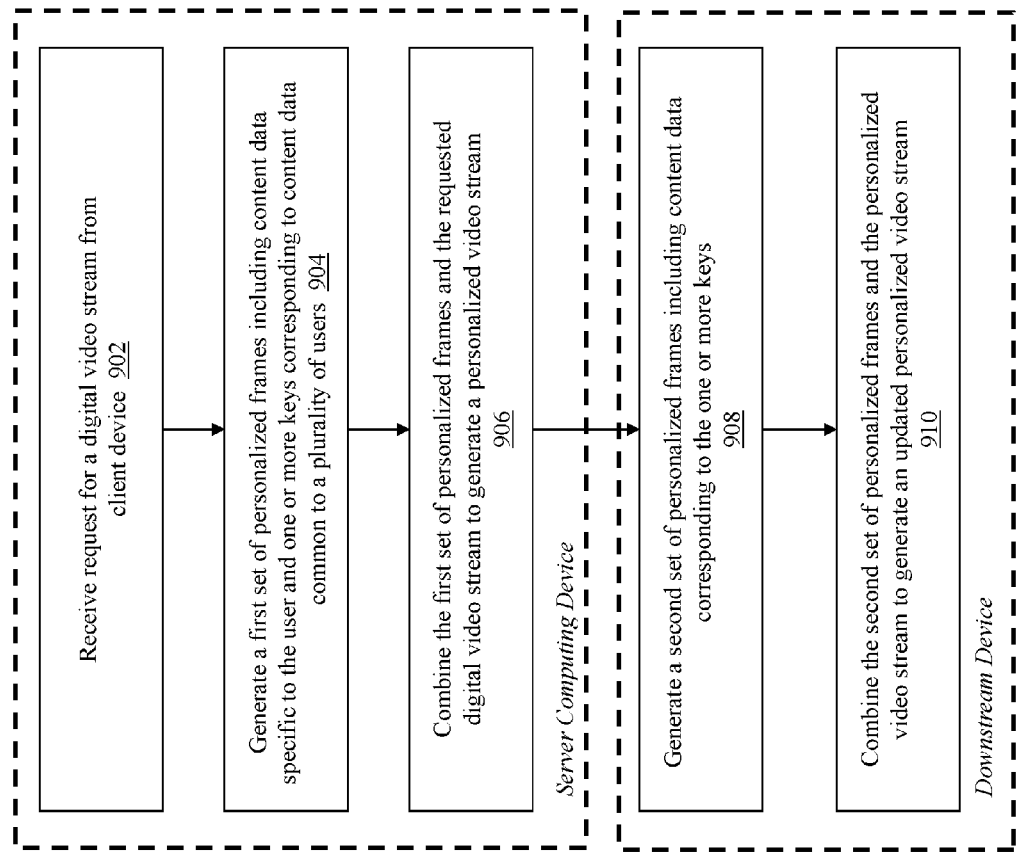
FIG. 9 is a flow diagram of an exemplary method for inserting personalized information into digital content using a downstream device.

FIG. 9 is a flow diagram of an exemplary method for inserting personalized information into digital content using a downstream device, using the system 800 of FIG. 8. The server computing device 106 receives (902) a request for a digital video stream from a client computing device 102 associated with a user. The server 106 generates (904) a first set of personalized frames to be inserted into the requested digital video stream, the personalized frames including content data specific to the user and one or more keys corresponding to content data common to a plurality of users. The server 106 combines (906) the first set of personalized frames and the requested digital video stream by extracting one or more frames from the requested digital video stream and replacing the extracted frames with one or more frames from the first set of personalized frames (an example of which is shown in FIG. 3) to generate a personalized video stream. The server 106 then transmits the personalized video stream to the downstream device 802.

Upon receiving the personalized video stream, the downstream device 802 generates (908) a second set of personalized frames to be inserted into the personalized video stream, where the second set of personalized frames include content data corresponding to the one or more keys. The downstream device 802 then combines (910) the second set of personalized frames and the personalized video stream by extracting one or more frames from the personalized video stream and replacing the extracted frames with one or more frames from the second set of personalized frames to generate an updated personalized video stream. The downstream device transmits the updated personalized video stream to the client device 102 for display to the user.

It should be appreciated that the system 100 can utilize a variety of techniques to reduce downstream load and make retrieval and delivery of personalized content streams more efficient—including via the use of other end point devices (e.g., mobile devices of other users) in proximity to the client computing device 102 that requested the personalized content stream. As an example, a first user may request a personalized content stream via his client computing device 102 while aboard an airplane. The content stream for the first user may include personalized information that is specific to the user, which the server 106 can retrieve and insert into the content stream (e.g., using a terrestrial data connection available on the plane). The content stream may also include personalized information elements from the common set of information as described above. Instead of requiring the server 106 to retrieve and insert the elements from the common set of information (thereby increasing the amount of data that must be transmitted via the relatively slow terrestrial connection), the server 106 can transmit the personalized content stream—with keys for the common elements—back to the user's client computing device 102. The client computing device 102 can then seek to resolve the keys for the common elements of information from other devices in close proximity (e.g., other devices on board the plane)—thereby reducing the bandwidth required and increasing the speed at which the personalized content stream is transmitted to the client device 102.

For example, the server 106 can transmit a series of stock quotes as part of a personalized content stream to a client device of a first user on the plane at, e.g., 4:05 pm eastern. Ten minutes later, the server 106 receives another request for a personalized content stream, this time from a second user on the same plane. Instead of resolving the stock quote data by going from the second user's device back down to the server 106 via the terrestrial connection, the keys inserted into the second user's personalized content stream by the server 106 can indicate that the first user's client device has the requested stock quotes and instruct the second user's device to connect (e.g., via local wifi, Bluetooth) to the first user's device and retrieve the necessary information. This embodiment can be implemented via, e.g., a custom application installed on the respective user's devices to which each user has authenticated, via a browser plug-in, or via other similar methods.

In addition, while it should be appreciated that the above description relates to extracting frames of digital video and/or audio from a video content stream and embedding frames of personalized information into the video stream, the same concepts and techniques can apply to the extraction of frames from an audio content stream (e.g., a podcast, a music stream, and the like) and embedding frames of personalized audio information into the stream. For example, a user may be listening to a satellite radio service (e.g., SiriusXM®) via his car radio. The car radio can operate as a client computing device 102 described above, in that the radio can request a personalized audio stream from an upstream server 106. The server 106 can extract frames from the satellite audio stream and replace those frames with, e.g., personalized audio information and/or keys as described above. The personalized audio stream is transmitted back to the car radio, which plays the stream including the personalized audio elements.

The above-described systems and methods can be implemented in digital electronic circuitry, in computer hardware, firmware, and/or software. The implementation can be as a computer program product (i.e., a computer program tangibly embodied in a computer readable storage medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implements that functionality.

Processors suitable for the execution of a computer program include, by way of example, special purpose microprocessors specifically programmed with instructions to carry out the methods described herein. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The remote/client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry® or iPhone®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for personalizing media content, the method comprising
    determining, by a server computing device, content data likely to be requested by a plurality of users based upon at least one of a geolocation associated with a subset of the plurality of users;
    generating, by the server computing device, one or more common sets of information using the content data likely to be requested by a plurality of users, each common set of information containing content data corresponding to a geolocation;
    receiving, by the server computing device, a request for a digital media stream from a client device, the request including authentication data associated with a user of the client device;
    generating, by the server computing device, a first set of personalized frames to be inserted into the requested digital media stream, wherein the personalized frames include content data specific to the user and one or more keys corresponding to a selected common set of information, the common set of information selected based upon a geolocation associated with the user;
    combining, by the server computing device, the first set of personalized frames and the requested digital media stream by extracting one or more frames from the requested digital media stream and replacing the extracted frames with one or more frames from the first set of personalized frames to generate a personalized media stream;
    transmitting, by the server computing device, the personalized media stream to a downstream device;
    generating, by the downstream device, a second set of personalized frames to be inserted into the personalized media stream, wherein the second set of personalized frames includes content data corresponding to the one or more keys;
    combining, by the downstream device, the second set of personalized frames and the personalized media stream by extracting one or more frames from the personalized media stream and replacing the extracted frames with one or more frames from the second set of personalized frames to generate an updated personalized media stream; and
    transmitting, by the downstream device, the updated personalized media stream to the client device.

2. The method of claim 1, further comprising encrypting, by the server computing device, the content data specific to the user using the authentication data.

3. The method of claim 1, further comprising encrypting, by the downstream device, the content data corresponding to the one or more keys using the authentication data.

4. The method of claim 1, wherein the downstream device is a cable head-end, a router, a modem, a content cache, a cell tower, or a client computing device.

5. The method of claim 1, wherein the frames containing the one or more keys are fewer than the frames containing the content data specific to the user.

6. The method of claim 1, wherein the step of determining content data likely to be requested by a plurality of users comprises
    analyzing, by the server computing device, a temporal characteristic associated with the content data; and
    selecting, by the server computing device, content data based upon the temporal characteristic.

7. The method of claim 1, wherein the geolocation associated with the user comprises a zip code stored in a user profile for the user, a location of the client device, or both.

8. The method of claim 1, wherein the step of generating a second set of personalized frames to be inserted into the personalized media stream comprises
    extracting, by the downstream device, the one or more keys from the personalized media stream;
    retrieving, by the downstream device, content data corresponding to the one or more keys; and
    generating, by the downstream device, the second set of personalized frames using the content data corresponding to the one or more keys.

9. The method of claim 8, wherein the downstream device retrieves the content data corresponding to the one or more keys from a local storage device.

10. The method of claim 1, wherein the downstream device is logically coupled between the server computing device and the client device so that data transmitted from the server computing device travels through the downstream device before reaching the client device.

11. A system for personalizing media content, the system comprising
    a server computing device configured to
        determine content data likely to be requested by a plurality of users based upon at least one of a geolocation associated with a subset of the plurality of users;
        generate one or more common sets of information using the content data likely to be requested by a plurality of users, each common set of information containing content data corresponding to a geolocation;
        receive a request for a digital media stream from a client device, the request including authentication data associated with a user of the client device;
        generate a first set of personalized frames to be inserted into the requested digital media stream, wherein the personalized frames include content data specific to the user and one or more keys corresponding to a selected common set of information, the common set of information selected based upon a geolocation associated with the user;
        combine the first set of personalized frames and the requested digital media stream by extracting one or more frames from the requested digital media stream and replacing the extracted frames with one or more frames from the first set of personalized frames to generate a personalized media stream; and
        transmit the personalized media stream to a downstream device;
    the downstream device configured to
        generate a second set of personalized frames to be inserted into the personalized media stream, wherein the second set of personalized frames includes content data corresponding to the one or more keys;
        combine the second set of personalized frames and the personalized media stream by extracting one or more frames from the personalized media stream and replacing the extracted frames with one or more frames from the second set of personalized frames to generate an updated personalized media stream; and
transmit the updated personalized media stream to the client device.

12. The system of claim 11, the server computing device further configured to encrypt the content data specific to the user using the authentication data.

13. The system of claim 11, the downstream device further configured to encrypt the content data corresponding to the one or more keys using the authentication data.

14. The system of claim 11, wherein the downstream device is a cable head-end, a router, a modem, a content cache, a cell tower, or a client computing device.

15. The system of claim 11, wherein the frames containing the one or more keys are fewer than the frames containing the content data specific to the user.

16. The system of claim 11, wherein for the step of determining content data likely to be requested by a plurality of users, the server computing device is configured to
analyze a temporal characteristic associated with the content data; and
select content data based upon the temporal characteristic.

17. The system of claim 11, wherein the geolocation associated with the user comprises a zip code stored in a user profile for the user, a location of the client device, or both.

18. The system of claim 11, wherein the step of generating a second set of personalized frames to be inserted into the personalized media stream comprises
extracting, by the downstream device, the one or more keys from the personalized media stream;
retrieving, by the downstream device, content data corresponding to the one or more keys; and
generating, by the downstream device, the second set of personalized frames using the content data corresponding to the one or more keys.

19. The system of claim 18, wherein the downstream device retrieves the content data corresponding to the one or more keys from a local storage device.

20. The system of claim 11, wherein the downstream device is logically coupled between the server computing device and the client device so that data transmitted from the server computing device travels through the downstream device before reaching the client device.

21. A computer program product, tangibly embodied in a non-transitory computer readable storage device, for personalizing media content, the computer program product including instructions operable to cause a server computing device to
determine content data likely to be requested by a plurality of users based upon at least one of a geolocation associated with a subset of the plurality of users;
generate one or more common sets of information using the content data likely to be requested by a plurality of users, each common set of information containing content data corresponding to a geolocation;
receive a request for a digital media stream from a client device, the request including authentication data associated with a user of the client device;
generate a first set of personalized frames to be inserted into the requested digital media stream, wherein the personalized frames include content data specific to the user and one or more keys corresponding to a selected common set of information, the common set of information selected based upon a geolocation associated with the user;
combine the first set of personalized frames and the requested digital media stream by extracting one or more frames from the requested digital media stream and replacing the extracted frames with one or more frames from the first set of personalized frames to generate a personalized media stream; and
transmit the personalized media stream to a downstream device;
wherein the downstream device
generates a second set of personalized frames to be inserted into the personalized media stream, wherein the second set of personalized frames includes content data corresponding to the one or more keys;
combines the second set of personalized frames and the personalized media stream by extracting one or more frames from the personalized media stream and replacing the extracted frames with one or more frames from the second set of personalized frames to generate an updated personalized media stream; and
transmits the updated personalized media stream to the client device.

* * * * *